United States Patent
Mora

(10) Patent No.: US 10,911,785 B2
(45) Date of Patent: Feb. 2, 2021

(54) INTELLIGENT COMPRESSION OF GRAINY VIDEO CONTENT

(71) Applicant: ATEME, Velizy Villacoublay (FR)

(72) Inventor: Elie Gabriel Mora, Paris (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 16/196,218

(22) Filed: Nov. 20, 2018

(65) Prior Publication Data

US 2019/0158885 A1 May 23, 2019

(30) Foreign Application Priority Data

Nov. 23, 2017 (FR) ...................... 17 61125

(51) Int. Cl.
| | | |
|---|---|---|
| H04B 1/66 | (2006.01) | |
| H04N 7/12 | (2006.01) | |
| H04N 11/02 | (2006.01) | |
| H04N 11/04 | (2006.01) | |
| H04N 19/85 | (2014.01) | |

(Continued)

(52) U.S. Cl.
CPC ........... H04N 19/85 (2014.11); H04N 19/117 (2014.11); H04N 19/136 (2014.11); H04N 19/146 (2014.11); H04N 19/172 (2014.11); H04N 19/86 (2014.11); *G06T 2207/20204* (2013.01); *H04N 19/103* (2014.11);
(Continued)

(58) Field of Classification Search
CPC .......... G06T 2207/20204; H04N 19/85; H04N 19/146; H04N 19/115
See application file for complete search history.

(56) References Cited

U.S. PATENT DOCUMENTS

| 8,447,127 B2* | 5/2013 | Gomila | ................. H04N 5/262 |
| | | | 382/254 |
| 2006/0083314 A1* | 4/2006 | Cooper | ................. H04N 19/44 |
| | | | 375/240.25 |

(Continued)

FOREIGN PATENT DOCUMENTS

| EP | 0 758 186 A2 | 2/1997 |
| EP | 1 564 997 A1 | 8/2005 |

(Continued)

OTHER PUBLICATIONS

Search Report issued in related application FR 17 61125, dated Aug. 17, 2018, 11 pages.

(Continued)

*Primary Examiner* — Fabio S Lima
(74) *Attorney, Agent, or Firm* — Faegre Drinker Biddle & Reath LLP

(57) ABSTRACT

A method for processing a video stream prior to encoding, the video stream potentially comprising a film grain, the method comprising: measuring a film grain intensity in the video stream; obtaining at least one encoding rate information item associated with the video stream, in order to determine a pair of respective values for the grain intensity and encoding rate; comparing the pair values with predetermined respective threshold values in order to categorize the video stream with respect to pairs of predetermined values of grain intensity and rate; and selecting a film grain management strategy among at least four combinations based on the categorization of the video stream.

20 Claims, 12 Drawing Sheets

(51) Int. Cl.
H04N 19/146 (2014.01)
H04N 19/136 (2014.01)
H04N 19/117 (2014.01)
H04N 19/172 (2014.01)
H04N 19/86 (2014.01)
H04N 19/19 (2014.01)
H04N 19/115 (2014.01)
H04N 19/103 (2014.01)
H04N 19/147 (2014.01)

(52) U.S. Cl.
CPC .......... *H04N 19/115* (2014.11); *H04N 19/147* (2014.11); *H04N 19/19* (2014.11)

(56) References Cited

U.S. PATENT DOCUMENTS

| | | | |
|---|---|---|---|
| 2007/0014484 A1* | 1/2007 | MacInnis | H04N 19/80 382/275 |
| 2007/0160138 A1* | 7/2007 | Wedi | H04N 19/18 375/240.03 |
| 2008/0192817 A1* | 8/2008 | Llach | G06T 5/002 375/240.01 |
| 2011/0103467 A1* | 5/2011 | Wedi | H04N 19/61 375/240.03 |
| 2013/0051457 A1* | 2/2013 | Joshi | H04N 19/90 375/240.03 |
| 2016/0198165 A1 | 7/2016 | Zhou et al. | |
| 2017/0180713 A1* | 6/2017 | Trail | G06F 3/0304 |

FOREIGN PATENT DOCUMENTS

| | | |
|---|---|---|
| EP | 1 569 458 A1 | 8/2005 |
| EP | 3 041 236 A1 | 7/2016 |
| JP | 2008-066911 A | 3/2008 |

OTHER PUBLICATIONS

Dai et al., "Film grain noise removal and synthesis in video coding," IEEE International Conference on Acoustics Speech and Signal Processing (ICASSP), IEEE, 2010, pp. 890-893.

Gomila et al., "SEI message for film grain noise," Proc. 8th Meeting Joint Video Team, Document JVT-H022, Geneva, Switzerland, May 2003, pp. 1-14.

Multicoreware Inc., "x265 Documentation," MulticoreWare Inc., 2014, retrieved from internet at <http://x265.readthedocs.io/en/default/> on Aug. 28, 2020, 112 pages.

Oh et al., "Advanced Film Grain Noise Extraction and Synthesis for High-Definition Video Coding," IEEE Transactions On Circuits and Systems for Video Technology, Dec. 2009, vol. 19, No. 12, pp. 1717-1729.

Sun et al., "DCT coefficients generation model for film grain noise and its application in super-resolution", IEEE International Conference on Image Processing (ICIP), IEEE, 2014, pp. 3857-3861.

Vitale, "Film Grain, Resolution and Fundamental Film Particles," 2007, Version 20, <http://cool.conservation-us.org/coolaic/sg/emg/library/pdf/vitale/2007-04-vitale-filmgrain_resolution.pdf>, pp. 1-26.

Wedi et al., "Quantization Offsets for Video Coding," IEEE International Symposium on Circuits and Systems, IEEE, 2005, pp. 324-327.

* cited by examiner

INTELLIGENT COMPRESSION OF GRAINY VIDEO CONTENT

CROSS-REFERENCE TO RELATED APPLICATION

This application claims priority benefit under 35 U.S.C. § 119(d) from French Patent Application No. FR1761125, filed Nov. 23, 2017, the disclosure of which is incorporated by reference herein in its entirety.

FIELD

This disclosure lies in the field of image and video processing, specifically in film grain processing for video encoding. The disclosure relates to a method for processing a video stream comprising film grain.

BACKGROUND

The film grain present in an analog video signal gives the video a particular rendering. Because such rendering is well-established, video users may desire an equivalent rendering with a digital video signal. As a result, film grain is often added to a digital video signal in order to obtain a rendering similar to an analog video signal. When capturing a digital video signal, such as a high definition digital video signal for example, film grain is absent. A user may consider the absence of film grain in a video signal as a disadvantage. Indeed, without film grain, the rendering of a human face in a digital video signal can appear "inanimate". Therefore, when recording the digital video signal, film grain is often added after capture. Due to the need to add film grain to a digital video signal, many companies are marketing software called "digital grain generators". One can therefore grasp the importance of adding film grain to a digital video signal.

However, film grain poses difficulties when encoding a video signal. The presence of film grain increases the required complexity of the processing that corresponds to encoding the digital video signal. Encoding video content comprising film grain involves a higher encoding cost (in number of bits). As a result, depending on the video encoder chosen, the encoding of video content comprising film grain may prove to be a major difficulty. Moreover, after encoding digital video content comprising film grain, there is no guarantee that the result is equivalent or close to the rendering obtained with analog video content comprising film grain.

In order to overcome the difficulty of managing grainy video content for video encoders, several solutions are proposed in the literature. A first solution often proposed consists of completely removing the film grain from the video content, the goal being to encode a video content from which all film grain is removed. A message is inserted into the video stream, transmitting information to the decoder to indicate that the film grain must be added after decoding. This solution has significant disadvantages. In fact, not all decoders support this function.

Another solution concerning the management of grainy video content is to propose processing of the film grain in order to preserve it during video encoding. However, such a solution does not in any way guarantee the final result obtained, such as preserving a grainy appearance distributed evenly within the video content. In addition, the types of processing currently proposed in the literature are often insufficient or unsuitable for the encoding rate. Since the encoding rate is often barely taken into account or not taken into account at all in the management of grainy video content, the effectiveness of such a solution is limited.

The film grain present in analog video content is an inevitable phenomenon. When analog video content is converted to digital video content by a digitizing action, digital noise appears in the digital video content. Digital noise represents unwanted information present in the digital data corresponding to the digital video content. In the field of signal processing, undesired information within digital content (image or video) is considered digital noise. This digital noise can appear in the form of random details, which in the present case manifests as a film grain whose distribution is random. Film grain can also be added artificially after the capture of a digital video signal, as mentioned above.

The processing used to reduce or eliminate noise in an image or video is called "denoising". Therefore, in the following description, denoising is understood to mean a filter used to perform the denoising, meaning to reduce or eliminate the noise present in a video content.

Film grain has a relatively high energy level, with potential peaks in the high frequencies. The encoding of video content comprising film grain is therefore expensive in terms of resources. In addition, the video content suffers from poor motion estimation. Poor motion estimation yields an inaccurate prediction, and thus increases the cost of coding. The encoding rate is a non-trivial parameter to take into account in the management of grainy video content. When the encoding rate is not sufficiently high, a conventional encoder will often flatten the areas of an image containing film grain. Consequently, the rendering for a user can correspond to an unnatural effect, due to the coexistence of grainy and non-grainy areas within the same video content. The appearance rendered by a uniformly distributed film grain is therefore no longer guaranteed for the user.

In order to improve film grain management within video content, it has been proposed in the literature to remove film grain from video content during a pre-processing step prior to encoding the video. The film grain is then restored by the decoder. In such an application, an SEI ("Supplemental Enhancement Information") type of message is transmitted with the video stream.

Several techniques have been developed based on the removal of film grain before video encoding and its restoration after decoding. One of the existing film grain management techniques proposes removing the film grain with temporal filtering. The effect rendered by the film grain is restored by the decoder using an autoregressive model. An alternative solution of the prior art is to propose a parameterized model that synthesizes, after decoding, a grain that statistically resembles the original grain. The prior art also proposes characterizing the film grain in the frequency domain.

The solutions presented above have a major disadvantage. In order to communicate the information concerning the film grain to the decoder, it is necessary to include an SEI type of message in the video stream. However, a decoder does not necessarily support this type of message. In such a case, where a video stream containing an SEI type of message is sent to the decoder and the decoder does not support this type of message, the message is simply ignored. No grain is added after decoding, and the end result is a smooth video with an unnatural rendering. Since video service providers do not have access to information about the type of decoder used by users, this type of solution is not widely used.

Another solution in film grain management for video content proposes the development of a standard tool. A disadvantage to implementing such a solution is that it requires the decoder to implement the developed tool. The application of such a solution therefore remains very limited.

Some video encoders offer a mode of operation suitable for video content comprising film grain. The proposed processing for film grain can be very effective but requires user intervention. A film grain management mode must be activated or deactivated by the user according to the video content viewed. If film grain processing is enabled when there is no film grain present in the video, such processing may actually degrade the video quality normally achieved without processing. Therefore, the user must intervene each time he or she wants to encode a different video content. The use of a video encoder comprising an operating mode suitable for managing video content comprising film grain, and which specifically requires activation by the user for each content item, is therefore limited.

U.S. Patent Application Publication No. 2016/0198165 A1 proposes a solution without user intervention. The film grain included in the video content is detected using a temporal calculation method. Once the film grain is detected, a rate reallocation is applied. Here, the encoding rate is not taken into account in the film grain management.

There is a need for a method for processing a pre-encoding video stream comprising film grain which does not have the above disadvantages.

There is also a need for a method for processing a video stream comprising film grain in which the encoding rate is taken into account.

The embodiments disclosed herein improve the situation.

SUMMARY

For this purpose, a first aspect of the disclosure relates to a method, implemented by computer means, for processing a video stream prior to encoding, the video stream potentially comprising a film grain, the method comprising:
  measuring a film grain intensity in the video stream;
  obtaining at least one encoding rate information item associated with the video stream, in order to determine a pair of respective values for the grain intensity and encoding rate;
  comparing the pair values with predetermined respective threshold values in order to categorize the video stream with respect to pairs of predetermined values of grain intensity and rate; and
  selecting a film grain management strategy among at least four combinations based on the categorization of the video stream.

Thus, the film grain intensity and video encoding rate are taken into account in order to propose a film grain management strategy suitable for the video content. Such a method has the advantage of being fully automatic. Explicit intervention or parameterization by the user is unnecessary. In addition, the application of a film grain management strategy can be deployed upstream of any existing encoding system.

In addition, if the rate is less than a first rate threshold ($D0$), image denoising is applied with a denoising strength that is a function of the measured grain intensity.

According to one embodiment, if the rate is greater than a first rate threshold ($D_0$) and if the measured grain intensity is less than a first intensity threshold ($I_0$), no film grain management processing is applied to the video stream.

According to one embodiment, if the rate is greater than a first rate threshold ($D0$) and if the measured grain intensity is greater than a first threshold ($I0$), energy conservation processing is applied to the video stream.

According to one embodiment, if the rate is also less than a second rate threshold ($D1$), said second rate threshold ($D1$) being greater than the first rate threshold ($D0$), and if the measured grain intensity is greater than a second intensity threshold ($I1$) which is greater than the first intensity threshold ($I0$), a low-pass filter is applied to the image in addition to the energy conservation processing applied to the video stream, in order to attenuate the grain high frequencies.

In addition, the energy conservation processing applied to the video stream may comprise a more equitable allocation of the encoding rate associated with the video stream to the different frames that compose the stream.

In addition, the energy conservation processing applied to the video stream may comprise using an energy difference in the rate-distortion cost calculations.

According to one embodiment, the method may further comprise: a transmission of the video stream, said video stream being without any message related to the presence of film grain.

Thus, no standardized processing that cannot be interpreted by a standard decoder is introduced.

In addition, the message related to the presence of film grain is a SEI type message.

It is thus possible to propose a film grain management strategy without transmitting an SEI type of message with the video stream.

A second aspect of the disclosure relates to a computer program comprising instructions for implementing the steps of the method according to one of the preceding embodiments, when these instructions are executed by a processor.

A third aspect of the disclosure relates to a non-transitory computer-readable medium storing a program causing a computer to execute a method for processing a video stream prior to encoding, the video stream potentially comprising a film grain, the method comprising: measuring a film grain intensity in the video stream; obtaining at least one encoding rate information item associated with the video stream, in order to determine a pair of respective values of grain intensity and encoding rate; comparing the pair values with predetermined respective threshold values in order to categorize the video stream with respect to pairs of predetermined values of grain intensity and rate; and selecting a film grain management strategy among at least four combinations based on the categorization of the video stream.

In some embodiments of the non-transitory computer readable medium, if the rate is less than a first rate threshold ($D_0$), image denoising is applied with a denoising strength based on the measured grain intensity.

In some embodiments of the non-transitory computer readable medium, if the rate is greater than a first rate threshold ($D_0$), and if the measured grain intensity is less than a first intensity threshold ($I_0$), no film grain management processing is applied to the video stream.

In some embodiments of the non-transitory computer readable medium, if the rate is greater than a first rate threshold ($D_0$), and if the measured grain intensity is greater than a first threshold ($I_0$), energy conservation processing is applied to the video stream.

In some embodiments of the non-transitory computer readable medium: if the rate is also less than a second rate threshold ($D_1$), the second rate threshold ($D_1$) being greater than the first rate threshold ($D_0$), and if the measured grain intensity is greater than a second intensity threshold ($I_1$) which is greater than the first intensity threshold ($I_0$), a low-pass filter is applied to the image in addition to the energy conservation processing applied to the video stream, in order to attenuate the grain high frequencies.

In some embodiments of the non-transitory computer readable medium, the energy conservation processing applied to the video stream comprises a more equitable allocation of the encoding rate associated with the video stream to the different frames that compose the stream.

In some embodiments of the non-transitory computer readable medium, the energy conservation processing applied to the video stream comprises: using an energy difference in the rate-distortion cost calculations.

A fourth aspect of the disclosure relates to an image processing apparatus for processing a video stream prior to encoding, the video stream potentially comprising a film grain, the device comprising:
a processor configured to carry out the following operations:
measuring a film grain intensity in the video stream;
obtaining at least one encoding rate information item associated with the video stream, in order to determine a pair of respective values of grain intensity and encoding rate;
comparing the pair values with predetermined respective threshold values in order to categorize the video stream with respect to pairs of predetermined values of grain intensity and rate; and
selecting a film grain management strategy among at least four combinations based on the categorization of the video stream.

In some embodiments of the image processing apparatus of the present subject disclosure, if the rate is less than a first rate threshold ($D_0$), the processor is further configured to apply image denoising with a denoising strength based on the measured grain intensity. In some embodiments of the image processing apparatus of the present subject disclosure, if the rate is greater than a first rate threshold ($D_0$), and if the measured grain intensity is less than a first intensity threshold ($I_0$), the processor is further configured to not apply film grain management processing to the video stream.

In some embodiments of the image processing apparatus of the present subject disclosure, if the rate is greater than a first rate threshold ($D_0$), and if the measured grain intensity is greater than a first threshold ($I_0$), the processor is further configured to apply energy conservation processing to the video stream.

In some embodiments of the image processing apparatus of the present subject disclosure: if the rate is also less than a second rate threshold ($D_1$), the second rate threshold ($D_1$) being greater than the first rate threshold ($D_0$), and if the measured grain intensity is greater than a second intensity threshold ($I_1$) which is greater than the first intensity threshold ($I_0$), the processor is further configured to apply a low-pass filter to the image in addition to the energy conservation processing applied to the video stream, in order to attenuate the grain high frequencies.

In some embodiments of the image processing apparatus of the present subject disclosure the energy conservation processing applied to the video stream comprises a more equitable allocation of the encoding rate associated with the video stream to the different frames that compose the stream.

BRIEF DESCRIPTION OF THE DRAWINGS

Other features and advantages of the disclosure will emerge from the following description, with reference to the appended figures which illustrate an exemplary embodiment which is in no way limiting and in which.

DETAILED DESCRIPTION

Figure 1:
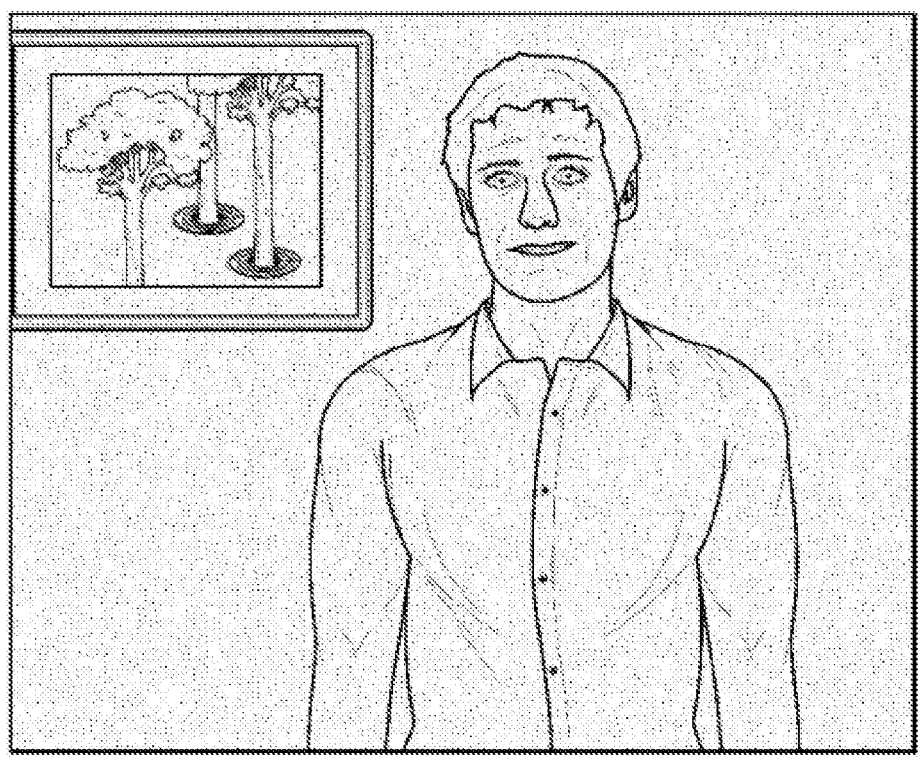
FIG. 1 represents an exemplary image comprising film grain, pulled from a video content.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the described embodiments. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media comprises, but are not limited to, both computer storage media and communication media comprising any medium that facilitates transfer of a computer program from one place to another. As used herein, a "computer storage media" may be any physical media that can be accessed by a computer or a processor. In addition, the terms «memory» and «computer storage media» include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium from that can be used to carry or store program code in the form of instructions or data structures which can be read by a computer processor, or a combination thereof. Also, various forms of computer-readable media may transmit or carry instructions to a computer, comprising a router, gateway, server, or other transmission device, wired (coaxial cable, fiber, twisted pair, DSL cable) or wireless (infrared, radio, cellular, microwave). The instructions may comprise code from any computer-programming language, comprising, but not limited to, assembly, C, C++, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be used. In particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

FIG. 1 shows an example of a grainy image pulled from a video content. FIG. 1 shows an individual in an indoor environment.

Figure 2:
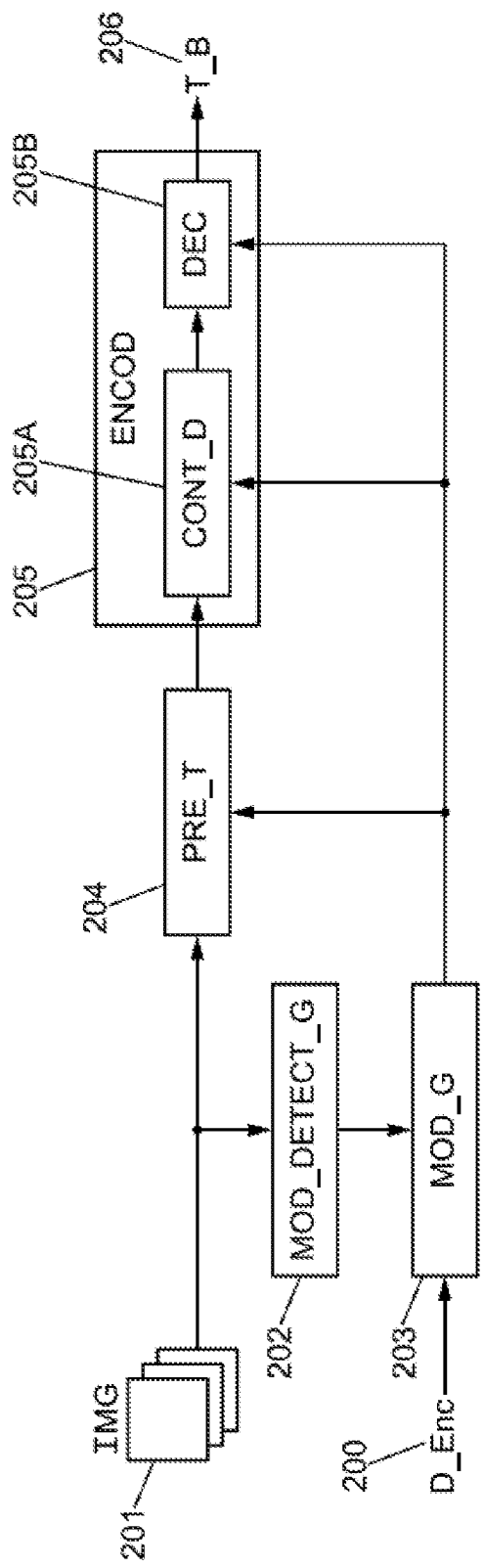
FIG. 2 represents an exemplary principle according to an embodiment.

FIG. 2 represents an exemplary principle according to an embodiment. A film grain management module MOD_G 203 has the function of determining a suitable strategy for managing the film grain in a video content IMG 201. Film grain detection is carried out by a film grain detection module MOD_DETECT_G 202. The film grain detection module MOD_DETECT_G 202 thus determines the film grain within the video content IMG 201. The film grain management module MOD_G 203 takes into account the information concerning the film grain detection which came from the film grain detection module MOD_DETECT_G 202. The film grain management module MOD_G 203 also takes into account the encoding rate D_ENC 200. The encoding rate D_ENC 200 represents the encoding rate desired by a user of the video content IMG 201. When the film grain management module MOD_G 203 is in possession of both information items, detected film grain and encoding rate, the film grain management module MOD_G 203 uses its information to intervene during the preprocessing of the video content PRE_T 204 as well as during the encoding of the pre-processed video content carried out by the encoder ENCOD 205.

For each frame to be encoded, the film grain detection module MOD_DETECT_G 202 measures the film grain intensity i. The value of the film grain intensity i measured by the film grain detection module MOD_DETECT_G 202 is then transmitted to the film grain management module MOD_G 203. The film grain management module MOD_G 203 also receives encoding rate information D_ENC 200. The encoding rate D_ENC 200 may be constant or variable per frame. The film grain management module MOD_G 203 then proceeds to categorizing the video content IMG 201 by comparing the film grain intensity i to film grain intensity threshold values and also comparing the encoding rate value D_ENC 200 to encoding rate threshold values. Processing is then applied to the video stream IN in a step TRAIT(IN) 304.

Figure 3:
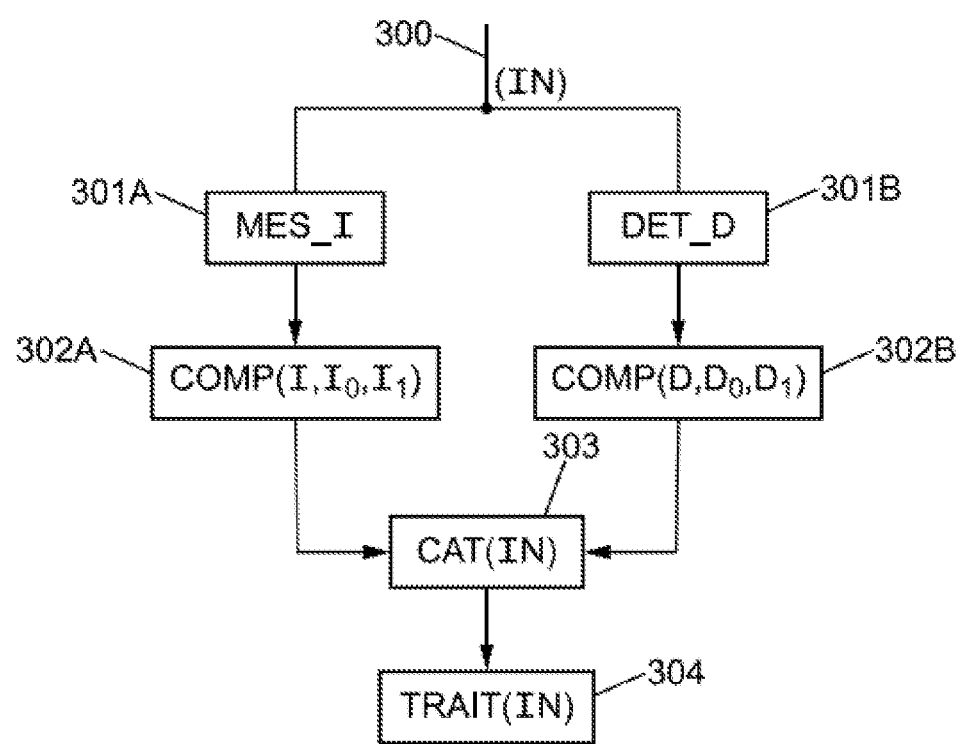
FIG. 3 illustrates steps of the method for processing a video stream according to one exemplary embodiment.

FIG. 3 illustrates the steps of the method for processing a video stream IN 300 according to one exemplary embodiment. Using a video stream IN 300 comprising film grain, a film grain intensity i is measured MES_i in step 301A. Similarly, an encoding rate d is determined from a video stream IN 300. The value of the measured film grain intensity i is compared to film grain intensity threshold values $I_0$ and $I_1$ during a first comparison step COMP (i, $I_0$, $I_1$) 302A. Similarly, the determined encoding rate value d is compared to encoding rate threshold values $D_0$ and $D_1$ during a second comparison step COMP (d, $D_0$, $D_1$) 302B. Following steps 302A and 302B respectively comparing the measured film grain intensity i and the determined encoding rate d to respective threshold values, the video stream IN 300 is categorized in a categorization step CAT(IN) 303.

In the exemplary embodiment shown in FIG. 3, the value of the film grain intensity i is compared to the film grain intensity threshold values $I_0$ and $I_1$. An example of the comparison as described in step COMP (i, $I_0$, $I_1$) 302A may provide the following result:

When $i<I_0$, the video content is considered to contain low film grain.

When $I_0 \leq i < I_1$, the video content is considered to contain medium film grain.

When $i \geq I_1$, the video content is considered to contain high film grain.

Similarly, the determined encoding rate value d is compared to the encoding rate threshold values $D_0$ and $D_1$. An example of the comparison as described in step COMP (d, $D_0$, $D_1$) 302B may provide the following result:

When $d < D_0$, the encoding rate is considered low.

When $D_0 \leq d < D_1$, the encoding rate is considered medium.

When $d \geq D_1$, the encoding rate is considered high.

After these two comparison steps COMP (i, $I_0$, $I_1$) 302A and COMP (d, $D_0$, $D_1$) 302B, the video content is then categorized according to step CAT(IN) 303. Depending on the categorization of the video content, different processing is applied. Energy conservation processing ECO may be applied for video content containing medium or high film grain at or above an encoding rate considered medium. Energy conservation processing ECO consists of one or more changes in the control of the encoding rate and in the decision to improve the preservation of film grain during encoding. When the video content is considered to contain medium film grain and the encoding rate is medium, a low-pass filter is coupled with the energy conservation processing ECO. This is intended to remove the high frequencies of the film grain. Indeed, the energy conservation processing ECO is insufficient for obtaining a satisfactory video content rendering. When the encoding rate d is low, the film grain is eliminated using a denoiser which can have a denoising strength proportional to the measured film grain intensity i.

Figure 4:
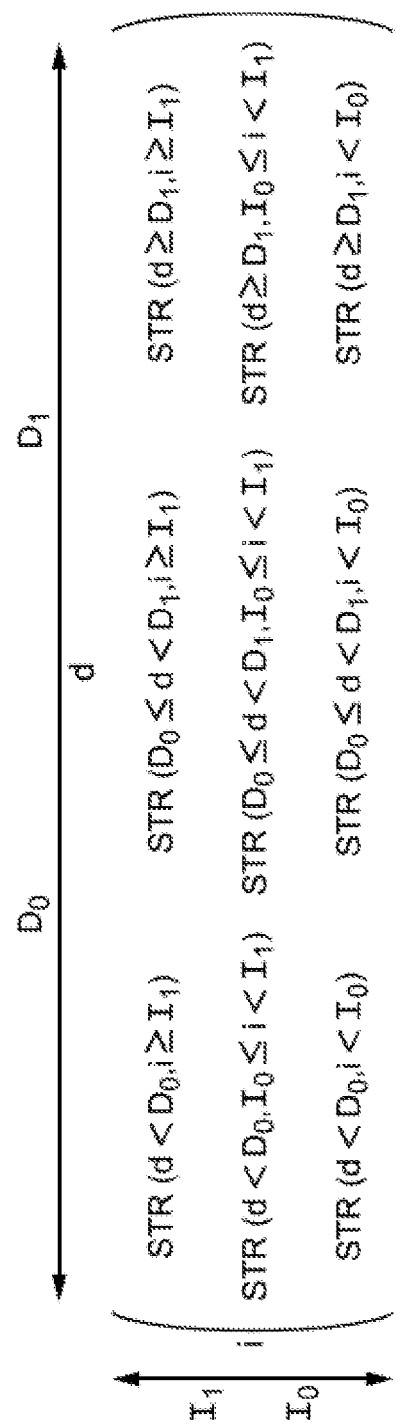
FIG. 4 illustrates an exemplary matrix representation of film grain management strategies.

In the exemplary embodiment described above, it is possible to represent the different possibilities in the form of a 3×3 matrix as represented in FIG. 4. A film grain management strategy STR(d, i) can be defined, thus taking into account both the measured film grain intensity i and the determined encoding rate d. For example, a film grain management strategy STR(d, i) can correspond to the application of processing and/or the application of a filter to the video content. A film grain management strategy STR(d, i) may also correspond to not performing a particular action. Again using the exemplary embodiment illustrated in FIG. 3 and described above, it is possible to obtain the following results:

STR ($d < D_0, i < I_0$)=application of a denoiser
STR ($D_0\ d < D_1, i < I_0$)=no action applied
STR ($d \geq D_1, i < I_0$)=no action applied
STR ($d < D_0, I_0 \leq i < I_1$)=application of a denoiser
STR ($D_0 \leq d < D_1, I_0 \leq i < I_1$)=energy conservation processing ECO applied
STR ($d \geq D_1, I_0 \leq i < I_1$)=energy conservation processing ECO applied
STR ($d < D_0, i \geq I_1$)=application of a denoiser
STR ($D_0 \leq d < D_1, i \geq I_1$)=energy conservation processing ECO applied, coupled with a low-pass filter
STR ($d \geq D_1, i \geq I_1$)=energy conservation processing ECO applied The strategy STR(d, i) is applied to the video content comprising film grain at the preprocessing and encoding level.

The film grain management module, for example such as the one described in FIG. 2, MOD_G 203, uses different methods to measure the film grain intensity. An algorithm using the calculation of temporal differences may for example be used. When using such an algorithm, a numerical value between 0 and 100 can be determined which thus represents the intensity of the film grain present in the video content. In such a calculation method, the more intense the grain, the greater the temporal differences. There are other methods for determining the film grain intensity present in a video content, for example such as the spectral analysis of a signal comprising film grain. In order to obtain this signal, a subtraction of the original signal and the same signal when denoised may for example be performed.

In FIG. 3, several cases may arise for the flow detection step DET_D 301B:

The encoding rate may be specified by the user in the case of CBR encoding. In this case, the rate is the same for all frames.

The medium encoding rate may be specified by the user in the case of VBR encoding. In this case as well, the rate is the same for all frames.

The instantaneous rate may be measured for each frame after a first encoding pass in the case of VBR encoding. In this case, the rate varies per frame, being higher in complex scenes and vice versa.

Figure 5:
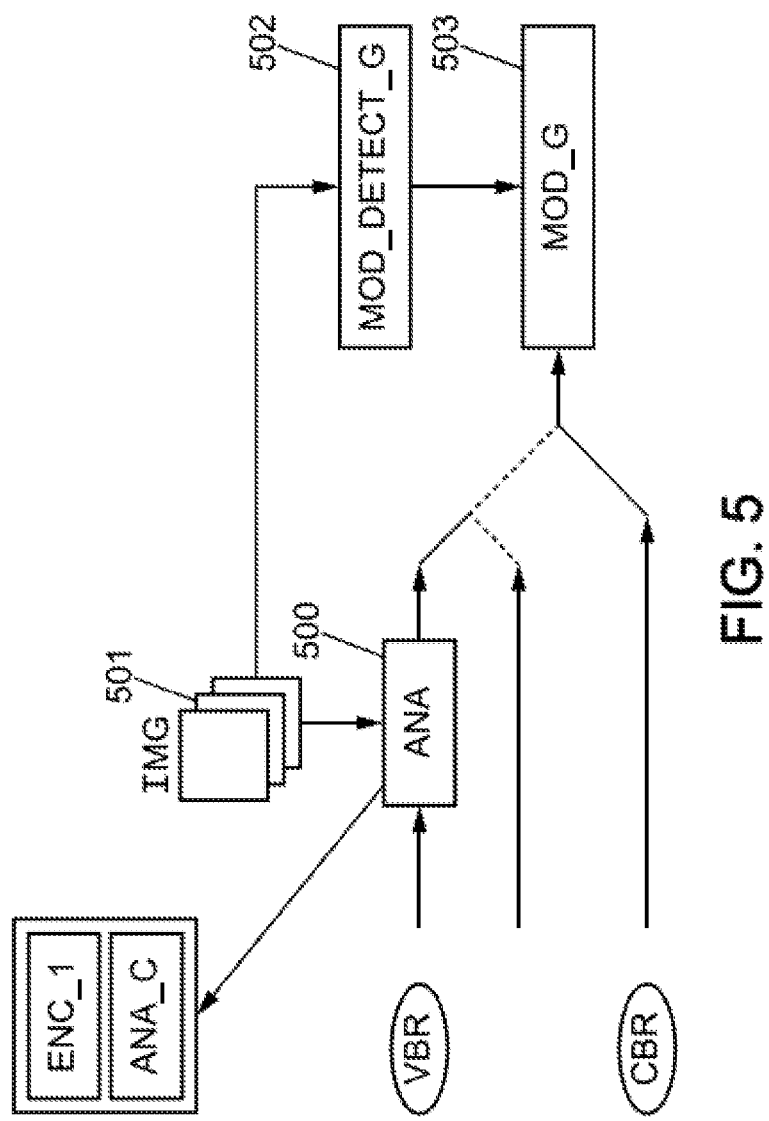
FIG. 5 illustrates obtaining the encoding rate for a current frame.

FIG. 5 shows an example of obtaining the encoding rate for a current frame. VBR ("Variable Bit Rate") refers to a variable encoding rate. CBR ("Constant Bit Rate") refers to a constant encoding rate. The user is targeting a medium rate, indicated by the user for a first encoding ENC_1 and a content analysis ANA_C within the module 500. A rate is thus calculated for the current frame. The images IMG 501 are analyzed by the film grain detection module MOD_DETECT_G 502 which then transmits the information to the film grain management module MOD_G 503. The film grain management module MOD_G 503 thus receives as input the rate information as well as the information from the film grain detection module MOD_DETECT_G 502.

In the previous example, the encoding rate was categorized into three different categories:

When $d < D_0$, the encoding rate is considered low.
When $D_0 \leq d < D_1$, the encoding rate is considered medium.
When $d \geq D_1$, the encoding rate is considered high.

The categorization of the encoding rate into different categories (three categories in this example) can take into account the resolution of the image. The resolution of the image can be denoted W×H ("Width×Height"), respectively designating the width and height of the image. The categorization of the encoding rate can also take into account the frame rate which will be denoted F, as well as the compression standard used. Thus, the calculation of the value of the encoding rate thresholds $D_0$ and $D_1$ of the preceding example can be formulated as follows:

$$D_0 = \alpha * F \cdot W \cdot H \quad D_1 = \beta * F \cdot W \cdot H$$

Since the value of the encoding rate threshold $D_1$ is greater than the value of the encoding rate threshold $D_0$, it can be deduced that $\beta > \alpha$. Parameters $\alpha$ and $\beta$ take into account the compression standard used.

The example of FIG. 3 indicated that energy conservation processing ECO can be applied to video content containing a medium or high grain, starting at an encoding rate considered to be medium. In order to improve film grain conservation during video encoding, several types of energy conservation processing can be used. Such energy conservation processing can be classified in two groups. Indeed, in FIG. 2, it can be seen that the film grain management module MOD_G 203 intervenes during encoding ENCOD 205, both in the rate control CONT_D 205A and in the decision process DEC 205B of the encoder ENCOD 205.

When energy conservation processing occurs in the rate control of the encoder, the allocation of the rate between the I, P, and B frames can be made more equitable. I, P, and B respectively come from the terms "Intra Coded Pictures", "Predicted Pictures", and "Bi-directionally predicted pictures". Such a rate allocation makes it possible to prevent the user who is viewing the video content from noticing an alternation between a grainy appearance of the video content and a smooth appearance of the video content. Such a situation can negatively impact the user's experience in viewing the video content.

In the decision process at the encoder, as illustrated by DEC 205B in FIG. 2, rate-distortion costs can be calculated. This is in order to determine the best coding mode to be used among the different coding modes proposed by the video compression standard.

The calculation can be expressed as follows:

$$J=D+\lambda R$$

where:
J is the rate-distortion cost
R is the rate associated with the encoding of the current block
λ is a weight factor
D is the measured distortion Calculation of the distortion may for example be performed by calculating a double summation on i and j, i and j respectively representing the indices of the first and the second summations.

$$D = \sum_i \sum_j |x_{ij} - \hat{x}_{ij}|$$

where:
$x_{ij}$ is the value of the pixel at position (i, j) of the current block
$\hat{x}_{ij}$ is the corresponding pixel in the reconstructed block In order to ensure better conservation of energy of the film grain, it is possible in the calculation of the rate-distortion cost J to take into account an energy difference E. The calculation of the rate-distortion cost J can then be expressed as follows:

$$J=D+\lambda R+\chi E$$

where:
χ is a weight factor
E is the energy difference between the source block and the reconstructed block The energy difference E can be calculated as a difference of double summations, as follows:

$$E = \sum_i \sum_j x_{ij}^2 - \sum_i \sum_j \hat{x}_{ij}^2$$

Using the energy difference E in the calculation of the rate-distortion cost J makes it possible during encoding to avoid producing "flattened" blocks which do not contain film grain. This is because the flattened predictions, although they reduce the mathematical distortion, visually eliminate the grain.

Incorporation of the energy difference E during the decision process of the encoder can be reproduced without modifying the calculation of the rate-distortion cost J. The energy difference can reduce the choice of Intra coding mode in P and B frames. Intra predictions are regularly flattened. A first solution, for example, may therefore be to not allow the encoder to test intra in P and B frames. Other solutions may include: not allowing the Skip mode test, disabling trellis, and prohibiting bi-directional predictions in B frames. These solutions can be combined with one another. Skip mode corresponds to an Inter coding mode, in which no block residual is transmitted. The block residual corresponds to a difference between the source block and the predicted block. In the decoder, the reconstructed block therefore exactly corresponds to the Inter prediction.

In the example mentioned in FIG. 4, it can be seen that in the case of an encoding rate d considered to be low, independently of the film grain intensity values, a denoiser is used. Indeed, when the value of the encoding rate d is less than the value of the encoding rate thresholds $D_0$, $d<D_0$:

STR ($d<D_0$, $i<I_0$)=application of a denoiser
STR ($d<D_0, I_0 \le i<I_1$)=application of a denoiser
STR ($d<D_0$, $d<D_0, i \ge I_1$)=application of a denoiser Therefore, the film grain management strategy STR (d, i) incorporating both the measured film grain intensity i and the determined encoding rate d consists of applying a denoiser to the video content when the encoding rate d is considered low. Indeed, when the encoding rate is low, the use of energy conservation processing is not sufficient to ensuring a satisfactory result in terms of film grain for the user viewing the video content. Therefore, the use of a denoiser completely removing the film grain from the video content avoids obtaining encoding artifacts where the film grain might be only partially distributed.

It is proposed to use a denoiser allowing image denoising with a denoising strength that is a function of the measured film grain intensity i. It is conceivable to use a denoiser whose denoising strength is proportional to the film grain intensity detected by the film grain detection module MOD_DETECT_G 202 as shown in FIG. 2 for example. Regulating the denoising strength according to the detected film grain intensity is justified by the fact that for video content comprising little film grain, a denoiser with a high denoising strength can impact important details in the video content. Indeed, a denoiser whose denoising strength is too high compared to the film grain contained in the video content could inadvertently smooth out contours or textures of the video content. This would therefore have a negative impact on the user's experience when viewing the video content.

When a video content is considered to contain a high film grain as mentioned with the example of FIG. 3, in other words when $i \ge I_1$, the denoiser strength must be high enough to eliminate the film grain contained in the video content. It is therefore possible to use several types of denoisers, for example such as FFT2D, MCTemporalDenoise, or a bilateral or anisotropic filter.

When video content is considered to contain high film grain with an encoding rate considered to be medium, as mentioned with the example of FIG. 3, in other words when $D_0 \le d<D_1$ and $i \ge I_1$, the energy conservation processing ECO may be insufficient to guarantee preservation of the film grain after encoding. This justifies having the film grain management strategy STR (d, i) in such a case consist of applying an energy conservation processing ECO coupled with a low-pass filter. The use of a low-pass filter makes it possible to eliminate certain high frequencies from the film grain and thus facilitate encoding. The removal of certain high frequencies from the film grain may yield a blurred appearance in the film grain but even so will be more valuable to the user than video content that is completely smoothed after denoising. It is of course possible to use several types of low-pass filters, for example Lanczos filter, bilinear filter, or bi-cubic filter.

In the example described in FIG. 4, different film grain management strategies STR (d, i) have been represented in matrix form. These film grain management strategies STR (d, i) were determined for the case where two encoding rate threshold values $D_0$ and $D_1$ and two film grain intensity threshold values $I_0$ and $I_1$ were previously determined.

In one embodiment where the encoding rate is constant, CBR. A film grain detection module such as the module MOD_DETECT_G 202 illustrated in FIG. 2 as an example detects, using a temporal difference algorithm, the intensity of the film grain comprised in the video content. The film grain intensity thus detected is quantified by a numerical value between 0 and 100.

The two film grain intensity threshold values $I_0$ and $I_1$ considered in this example are $I_0=20$ and $I_1=80$. Using the formulas defined above, calculating the value of the encoding rate thresholds $D_0$ and $D_1$ provides the following formulas:

$$D_0 = \frac{12*F*W*H}{24*3840*2160}$$

$$D_1 = \frac{30*F*W*H}{24*3840*2160}$$

Figure 6:
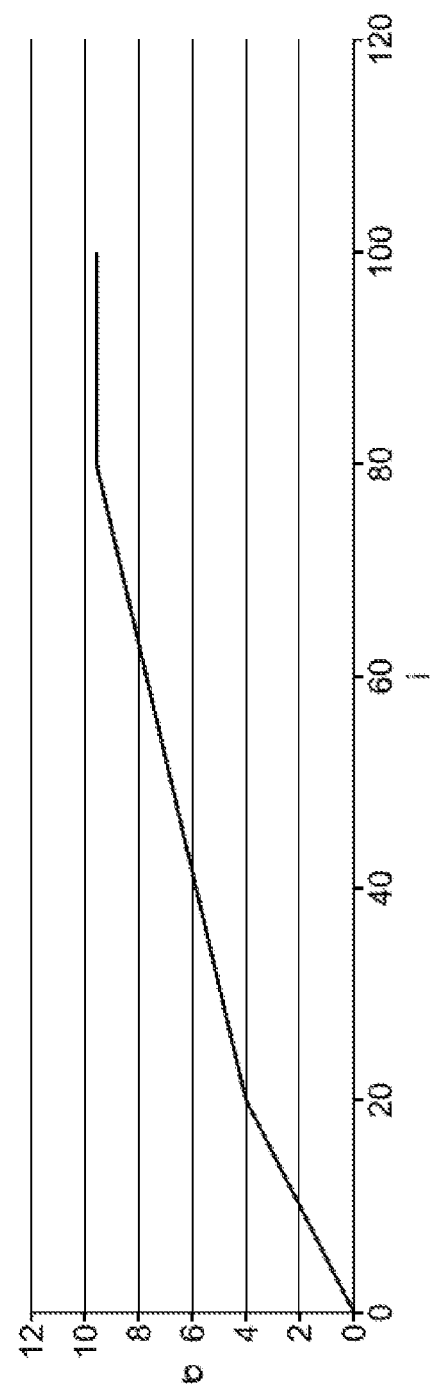
FIG. 6 represents the denoising strength σ of a first denoiser as a function of the film grain intensity i.

The denoiser used in this exemplary embodiment is the FFT2D denoiser. FIG. 6 shows the denoising strength a relative to the film grain intensity. Note that the denoising strength is a piecewise linear function relative to the film grain intensity. It is therefore possible to consider that the denoising strength σ of the denoiser used is proportional in intervals to the film grain intensity.

The low-pass filter used here is a Lanczos filter whose cutoff frequency is 0.5. Multiple energy conservation processing actions are applied. Such energy conservation processing may include reducing the differences in the quantization steps associated with I, P, and B frames. This allows a more equitable rate allocation. Other energy conservation processing may consist of prohibiting the choice of Intra coding mode in P and B frames, of skip mode in P and B frames. An alternative energy conservation processing may be disabling trellis.

Figure 7A:
FIGS. 7a, 7b, and 7c illustrate the result of encoding a content comprising high film grain at a low encoding rate, obtained after application of an exemplary embodiment.
Figure 7B:
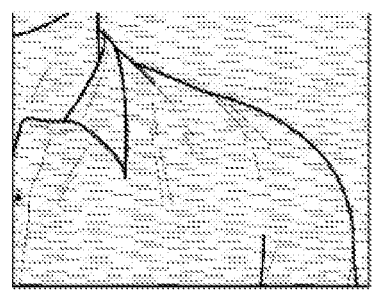
Figure 7C:

FIG. 7a shows an image taken from a video content containing a high film grain. The encoding considered here is an encoding of a 1920×1080 sequence containing high film grain in HEVC at 2.9 Mbps. HEVC is an acronym for the "High Efficiency Video Coding" compression standard. Mbps is another acronym, indicating an encoding rate and is an abbreviation for "Megabits per second". FIG. 7b represents the reference result obtained, while FIG. 7c represents the result obtained according to an embodiment. One can thus notice that a better result is obtained in FIG. 7c. This therefore allows greatly improving the experience of the user viewing the video content in question. An encoding rate of 2.9 Mbps is considered low, 2.9 Mbps<$D_0$=3 Mbps. Therefore, in a reference encoding with no application of a film grain management strategy, the film grain is not preserved in a satisfactory manner, which shows up as frequent flat areas as can be seen in FIG. 7b. Since the video content comprises a high film grain and the encoding rate is low, the film grain management strategy STR (d, i) which takes into account both the measured film grain intensity i and the determined encoding rate d will consist of applying a denoiser and then encoding the video content in order to provide a satisfactory result for the user. This therefore corresponds to the grain management strategy STR (d<$D_0$, i≥$I_1$).

Figure 8A:
FIGS. 8a, 8b, and 8c illustrate the result of encoding a content comprising a high film grain at a medium encoding rate, obtained after application of an exemplary embodiment.
Figure 8B:
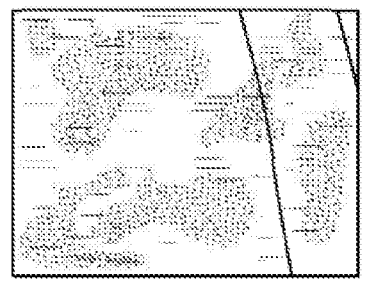
Figure 8C:
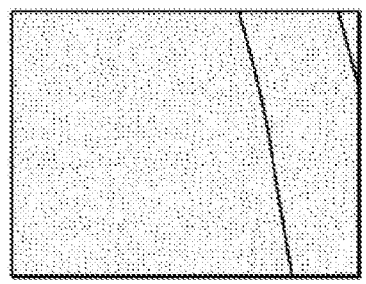

FIGS. 8a, 8b, and 8c illustrate the difference in results obtained according to an embodiment for video content comprising a high film grain with a medium encoding rate. FIG. 8a shows an image from the video content in question. FIG. 8b represents the reference result, and FIG. 8c the reference result obtained according to an embodiment. A medium encoding rate is expressed as $D_0 \leq d < D_1$ and a video content containing a high film grain is expressed as i≥$I_1$. In fact, $D_0=0.6$ Mbps<1 Mbps<$D_1=1.5$ Mbps. The video content SD 576p24 is encoded in HEVC at 1 Mbps with the embodiment. Therefore, the film grain management strategy STR (d, i) will consist of applying energy conservation processing coupled with a low-pass filter.

Thus, since the video content comprises a very high film grain, encoding without a film grain management strategy can provide a smooth, low-quality result with some irregularly distributed traces of grain as can be observed in FIG. 8b. Thus, according to an embodiment, a film grain management strategy STR ($D_0 \leq d < D_1$, i≥$I_1$) is applied, consisting of first filtering the high film gain frequencies and then applying energy conservation processing in order to preserve the residual film grain.

In one embodiment of the disclosure where the encoding rate is constant, CBR. A film grain detection module such as the module MOD_DETECT_G 202 illustrated as an example in FIG. 2 detects, using a temporal difference algorithm, the intensity of the film grain comprised in the video content. The film grain intensity thus detected is quantified by a numerical value between 0 and 100.

Using the formulas defined above, calculation of the value of the encoding rate thresholds $D_0$ and $D_1$ provides the following formulas:

$$D_0 = \frac{12*F*W*H}{24*3840*2160}$$

$$D_1 = \frac{30*F*W*H}{24*3840*2160}$$

Figure 9:
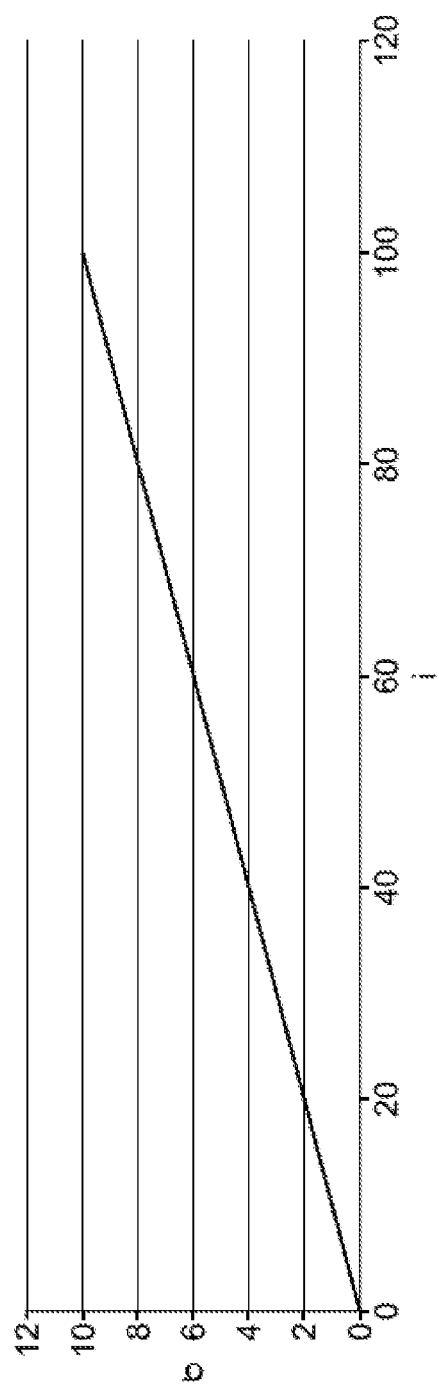
FIG. 9 represents the standard deviation σ of a second denoiser as a function of the film grain intensity i.

The denoiser used in this exemplary embodiment is a Gaussian filter with a standard deviation σ proportional to the grain intensity. FIG. 9 shows the standard deviation σ as a function of the measured film grain intensity i. One can easily note that this is a linear function. The low-pass filter used is a Lanczos filter with a cutoff frequency of 0.5. An applied energy conservation processing involves the reduction of differences in the quantization steps associated with the I, P, and B frames, thus allowing a more equitable rate allocation. Other energy conservation processing may consist of using the energy difference into the calculation of the rate-distortion cost at the encoder.

In this embodiment, the film grain intensity thresholds are variable. Therefore, these film grain intensity thresholds may differ for each image in the video content. The principle of this embodiment consists of categorizing an image N of the video content with respect to the pair of values for the film grain intensity i and encoding rate d of the previous image N−1. When the film grain intensity i detected by the film grain detection module such as module MOD_DETECT_G 202 illustrated in FIG. 2 is close to one of the film grain intensity thresholds, the threshold thus approached is increased or reduced in order to bias the next image N+1 into the same categorization, in other words to establish a correspondence of an equivalent pair of values for the film grain intensity i and encoding rate d. This is to ensure a certain stability in the application of film grain management strategies STR (d, i).

As a result, a dynamic change in the film grain intensity thresholds $I_j$ or j represents the considered threshold is performed. For example, the following method for dynamically changing thresholds can be used:

For the first image, indexed by 0, predetermined initial thresholds are used (for example, $I_0[0]$=20 and $I_1[0]$= 80)

For the second image, indexed by 1:

If the measured intensity of the first image, i[0], is greater than or equal to $I_1[0]$ then the thresholds used are:

$I_0[1]$=$I_0[0]$ $I_1[1]$=$I_1[0]$−max(0, 10−0.5*(i[0]−$I_1[0]$))

If $I_0[0]$<=i[0]<$I_1[0]$:

$I_0[1]$=$I_0[0]$−max(0, 10−0.5*(i[0]−$I_0[0]$))

$I_1[1]$=$I_1[0]$+max(0, 10−0.5*($I_0[0]$−i[0]))

If i[0]<$I_0[0]$:

$I_0[1]$=$I_0[0]$+max(0, 10−0.5*($I_0[0]$−i[0]))

$I_1[1]$=$I_0[1]$

...

For the (N+1)th image, indexed by N:

If i[N−1]>$I_1[N-1]$ $I_0[N]$=$I_0[N-1]$ $I_1[N]$=$I_1[N-1]$−max(0, 10−0.5*(i[N−1]−$I_1[N-1]$))

If $I_0[N-1]$<=i[N−1]<$I_1[N-1]$:

$I_0[N]$=$I_0[N-1]$−max(0, 10−0.5*(i[N−1]−$I_0[N-1]$))

$I_1[N]$=$I_1[N-1]$+max(0, 10−0.5*($I_1[N-1]$−i[N−1]))

If i[N−1]<$I_0[N-1]$:

$I_0[N]$=$I_0[N-1]$+max(0, 10−0.5*($I_0[N-1]$−i[N−1]))

$I_1[N]$=$I_0[N]$

Figure 10:
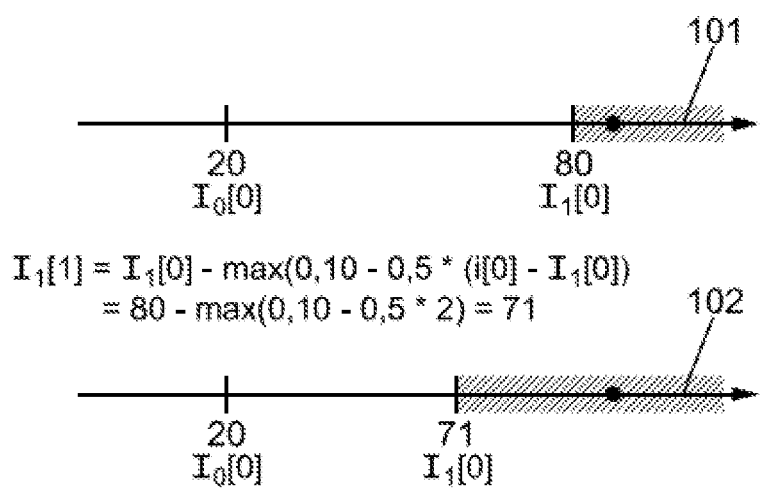
FIG. 10 illustrates an exemplary calculation of film grain intensity thresholds.

FIG. 10 illustrates the exemplary method for dynamically changing the film grain intensity thresholds, described above. Area 1001 in FIG. 10 indicates that the film grain intensity for the first indexed image 0 is 82, i[0]=82. The initial threshold is $I_0[0]$=80 which, on the scale of values between 0 and 100, corresponds to content comprising a high film grain. Calculation of $I_1[1]$ yields the value 71, thus providing a larger margin for the intensity i[1] thus favoring a content categorization comprising a high film grain as indicated by area 1002 of FIG. 10.

Figure 11:
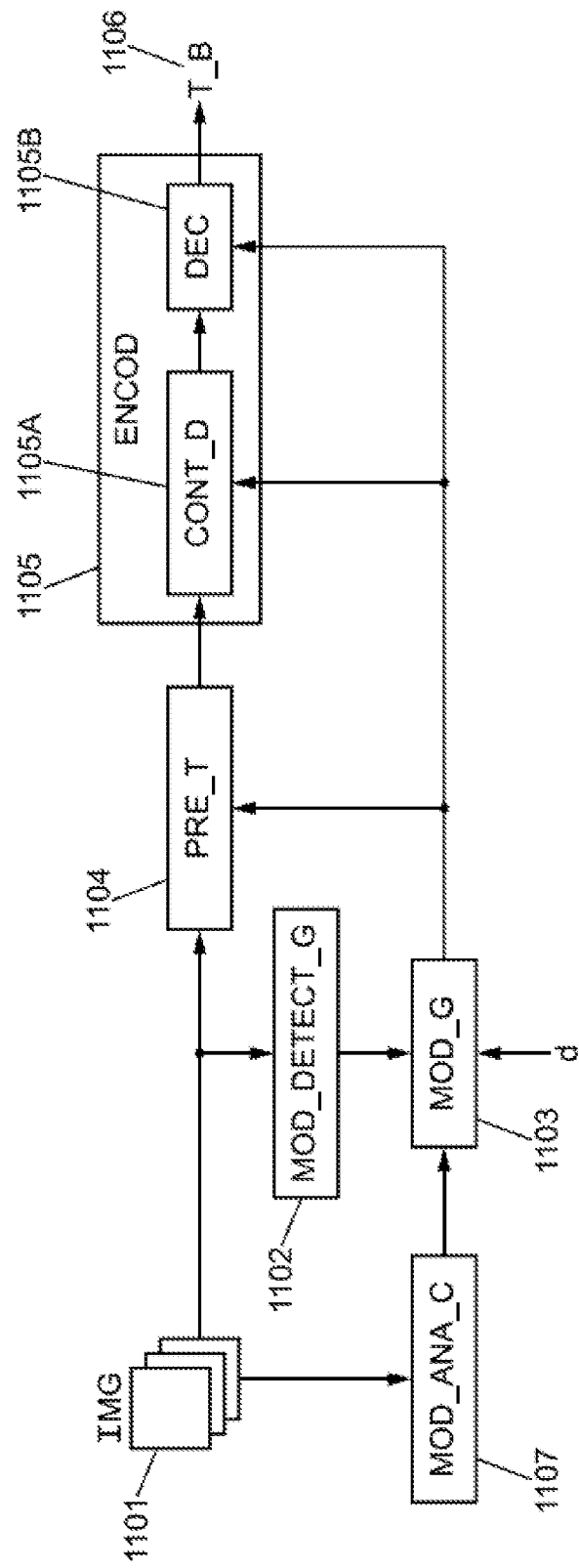
FIG. 11 illustrates an exemplary principle of the disclosure comprising a content analysis module.

The present disclosure can also be applied to the case where the encoding rate thresholds are variable. In such a situation, the encoding rate thresholds depend on the complexity of the video content. It is thus possible to interpose a content analysis module MOD_ANA_C 1107 in order to transmit the information to the grain management module MOD_G 1103 as illustrated in FIG. 11. The content analysis module MOD_ANA_C 1107 determines a value C which enables numerically quantifying the complexity of the content. For example, whether the video content contains fast motion sequences or sequences that include detailed textures. The content analysis module MOD_ANA_C 1107 thus provides this complexity information to the grain management module MOD_G 1103. For example, in the case of video content representing a sporting event, the complexity returned by the content analysis module MOD_ANA_C 1107 would be higher than in the case of a television news program. Complexity can also vary within the same sequence, for example when alternating between dialog scene and action scene. The value C resulting from the content analysis module MOD_ANA_C 1107 providing the complexity information can be used to adjust the encoding rate thresholds. It is therefore possible to insert the value of the complexity C into the calculation of encoding rate thresholds. Considering that such a value oscillates between 0 and 1, the calculation then provides the following expressions:

$$D_0 = \frac{C*12*F*W*H}{24*3840*2160}$$

$$D_1 = \frac{C*30*F*W*H}{24*3840*2160}$$

For example, the content analysis module MOD_ANA_C 1107 can provide a complexity C[i] for each image "i". The thresholds for each image "i" can therefore be expressed for example as follows:

$$D_0[i] = \frac{C[i]*12*F*W*H}{24*3840*2160}$$

$$D_1[i] = \frac{C[i]*30*F*W*H}{24*3840*2160}$$

Figure 12:
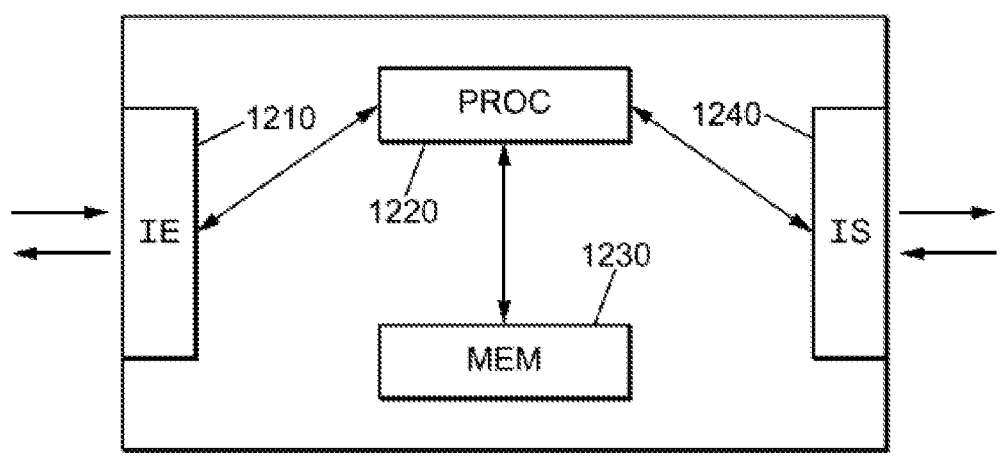
FIG. 12 illustrates a device according to one exemplary embodiment.

The disclosure can be implemented by a computing device, as illustrated by way of example in FIG. 12, which comprises a processing circuit comprising:

an input interface 1210, for receiving the image data to be processed, a processor 1220 cooperating with a memory 1230, for processing the image data received, and an output interface 1240 for delivering the image data processed by implementing the above method.

Said memory 1230 can typically store the instruction code of the computer program within the meaning of the disclosure (an example flowchart is shown in FIG. 3, described above). This instruction code can be read by the processor 1220 in order to execute the method according to the disclosure. The device may further comprise a working memory (distinct from or identical to memory 1230) for storing temporary data.

The disclosure is not limited to the exemplary embodiments described above by way of example, but encompasses all variants conceivable to those skilled in the art which fall within the scope of the following claims. For example, the disclosure is not limited in terms of the number of film grain intensity thresholds, nor in the number of encoding rate thresholds.

While the disclosure has been described with respect to preferred embodiments, those skilled in the art will readily appreciate that various changes and/or modifications can be made to the disclosure without departing from the spirit or scope of the disclosure as defined by the appended claims.

Although this disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method, implemented by computer means, for processing a video stream prior to encoding, the video stream potentially comprising a film grain, the method comprising:
    measuring a film grain intensity in the video stream;
    obtaining at least one desired encoding rate associated with the video stream, in order to determine a pair of respective values of grain intensity and desired encoding rate;
    comparing the pair values with predetermined respective threshold values in order to categorize the video stream with respect to pairs of respective threshold predetermined values of grain intensity and encoding rate; and
    selecting a film grain management strategy among at least four combinations based on the categorization of the video stream.

2. The method according to claim 1, wherein, if the desired encoding rate is less than a first rate threshold, image denoising is applied with a denoising strength based on the measured grain intensity.

3. The method according to claim 1, wherein, if the desired encoding rate is greater than a first encoding rate threshold, and if the measured grain intensity is less than a first intensity threshold, no film grain management processing is applied to the video stream.

4. The method according to claim 1, wherein, if the desired encoding rate is greater than a first rate threshold, and if the measured grain intensity is greater than a first threshold, energy conservation processing is applied to the video stream.

5. The method according to claim 4, wherein:
    if the desired encoding rate is also less than a second encoding rate threshold, the second encoding rate threshold being greater than the first encoding rate threshold, and
    if the measured grain intensity is greater than a second intensity threshold which is greater than the first intensity threshold,
    a low-pass filter is applied to the image in addition to the energy conservation processing applied to the video stream, in order to attenuate the grain high frequencies.

6. The method according to claim 4, wherein the energy conservation processing applied to the video stream comprises a more equitable allocation of the encoding rate associated with the video stream to the different frames that compose the stream.

7. The method according to claim 4, wherein the energy conservation processing applied to the video stream comprises: using an energy difference in the rate-distortion cost calculations.

8. A non-transitory computer-readable medium storing a program causing a computer to execute a method for processing a video stream prior to encoding, the video stream potentially comprising a film grain, the method comprising:
    measuring a film grain intensity in the video stream;
    obtaining at least one desired encoding rate associated with the video stream, in order to determine a pair of respective values of grain intensity and encoding rate;
    comparing the pair values with predetermined respective threshold values in order to categorize the video stream with respect to pairs of predetermined respective threshold values of grain intensity and rate; and
    selecting a film grain management strategy among at least four combinations based on the categorization of the video stream.

9. The non-transitory computer readable medium according to claim 8, wherein, if the desired encoding rate is less than a first encoding rate threshold, image denoising is applied with a denoising strength based on the measured grain intensity.

10. The non-transitory computer readable medium according to claim 8, wherein, if the desired encoding rate is greater than a first encoding rate threshold, and if the measured grain intensity is less than a first intensity threshold, no film grain management processing is applied to the video stream.

11. The non-transitory computer readable medium according to claim 8, wherein, if the desired encoding rate is greater than a first encoding rate threshold, and if the measured grain intensity is greater than a first threshold, energy conservation processing is applied to the video stream.

12. The non-transitory computer readable medium according to claim 11, wherein:
    if the desired encoding rate is also less than a second encoding rate threshold, the second encoding rate threshold being greater than the first encoding rate threshold, and
    if the measured grain intensity is greater than a second intensity threshold which is greater than the first intensity threshold,
    a low-pass filter is applied to the image in addition to the energy conservation processing applied to the video stream, in order to attenuate the grain high frequencies.

13. The non-transitory computer readable medium according to claim 11, wherein the energy conservation processing applied to the video stream comprises a more equitable allocation of the encoding rate associated with the video stream to the different frames that compose the stream.

14. The non-transitory computer readable medium according to claim 11, wherein the energy conservation processing applied to the video stream comprises: using an energy difference in the rate-distortion cost calculations.

15. An image processing apparatus for processing a video stream prior to encoding, the video stream potentially comprising a film grain, the image processing apparatus comprising:
    a processor configured to:
    measure a film grain intensity in the video stream;
    obtain at least one desired encoding rate associated with the video stream, in order to determine a pair of respective values of grain intensity and encoding rate;
    compare the pair values with predetermined respective threshold values in order to categorize the video stream with respect to pairs of predetermined respective threshold values of grain intensity and encoding rate; and
    select a film grain management strategy among at least four combinations based on the categorization of the video stream.

16. The image processing apparatus according to claim 15, wherein, if the desired encoding rate is less than a first encoding rate threshold, the processor is further configured to apply image denoising with a denoising strength based on the measured grain intensity.

17. The image processing apparatus according to claim 15, wherein, if the desired encoding rate is greater than a first encoding rate threshold, and if the measured grain intensity is less than a first intensity threshold, the processor is further configured to not apply film grain management processing to the video stream.

18. The image processing apparatus according to claim 15, wherein, if the desired encoding rate is greater than a first encoding rate threshold, and if the measured grain intensity is greater than a first threshold, the processor is further configured to apply energy conservation processing to the video stream.

19. The image processing apparatus according to claim 18, wherein:
- if the desired encoding rate is also less than a second encoding rate threshold, the second encoding rate threshold being greater than the first rate threshold, and
- if the measured grain intensity is greater than a second intensity threshold which is greater than the first intensity threshold, the processor is further configured to apply a low-pass filter to the image in addition to the energy conservation processing applied to the video stream, in order to attenuate the grain high frequencies.

20. The image processing apparatus according to claim 18, wherein the energy conservation processing applied to the video stream comprises a more equitable allocation of the encoding rate associated with the video stream to the different frames that compose the stream.

* * * * *